United States Patent

[11] 3,593,838

| [72] | Inventor | Salvatore Latone<br>Rochester, N.Y. |
|---|---|---|
| [21] | Appl. No. | 731,898 |
| [22] | Filed | May 24, 1968 |
| [45] | Patented | July 20, 1971 |
| [73] | Assignee | Xerox Corporation<br>Rochester, N.Y. |

[54] CONVEYOR BELT
1 Claim, 16 Drawing Figs.

| [52] | U.S. Cl. | 198/140 |
|---|---|---|
| [51] | Int. Cl. | B65g 17/12 |
| [50] | Field of Search | 198/140,<br>142, 116, 154, 33, 198 |

[56] References Cited

UNITED STATES PATENTS

| 3,070,210 | 12/1962 | Woodward | 198/33 (.1) |
|---|---|---|---|
| 697,874 | 4/1902 | Oldham | 198/140 |

FOREIGN PATENTS

| 1,444,059 | 5/1966 | France | 198/198 |
|---|---|---|---|
| 1,225,394 | 1/1960 | France | 198/142 |

*Primary Examiner*—Richard E. Aegerter
*Assistant Examiner*—Douglas D. Watts
*Attorneys*—Paul M. Enlow, Norman E. Schrader, James J. Ralabate and Ronald Zibelli ABSTRACT: A conveyor belt for vertically lifting particulate material from a lower receiving point and depositing it at a higher point, both points being located totally within the confines of the belt as are the openings for the buckets that make up the belt.

INVENTOR.
SALVATORE LATONE

INVENTOR.
SALVATORE LATONE

INVENTOR.
SALVATORE LATONE

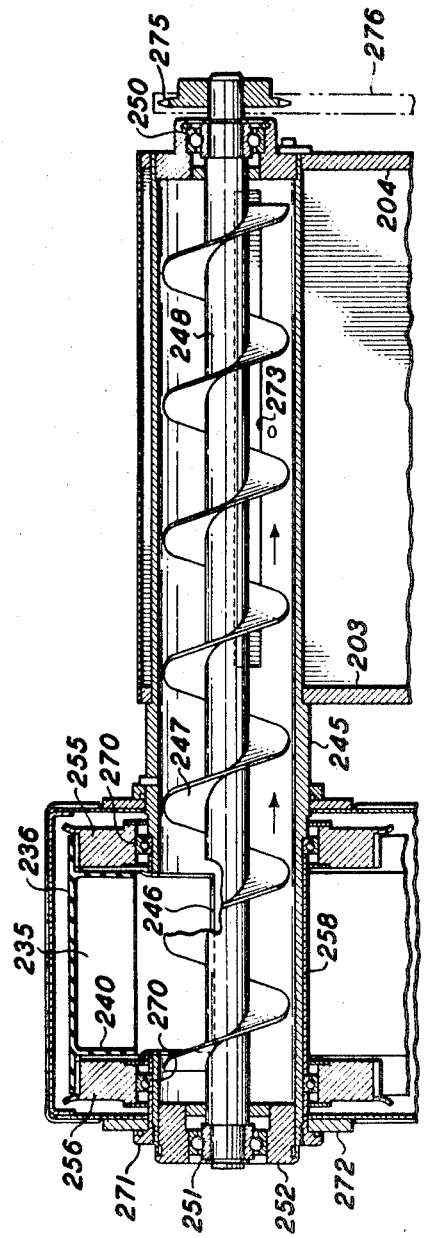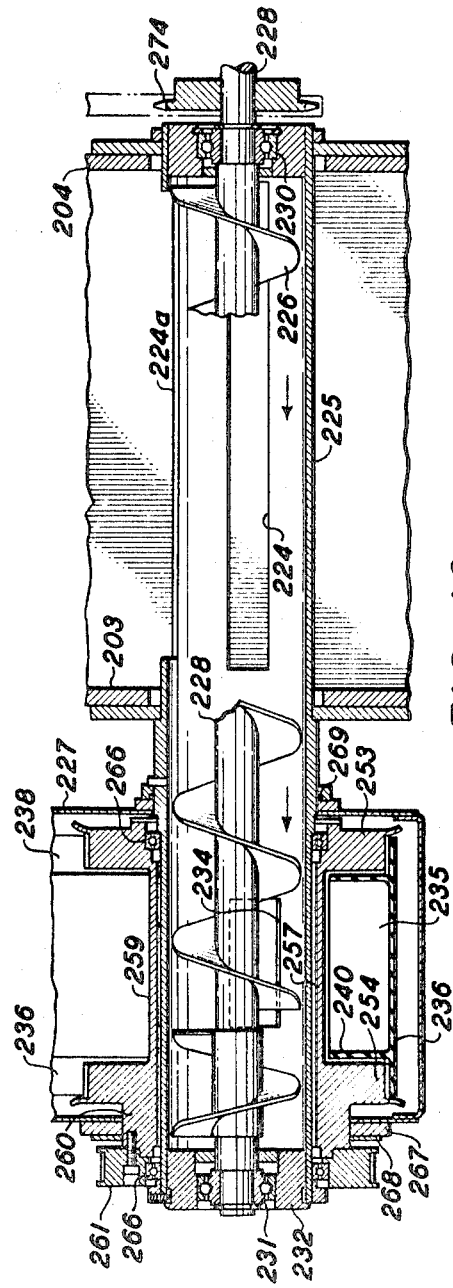

PATENTED JUL20 1971 3,593,838
SHEET 10 OF 11
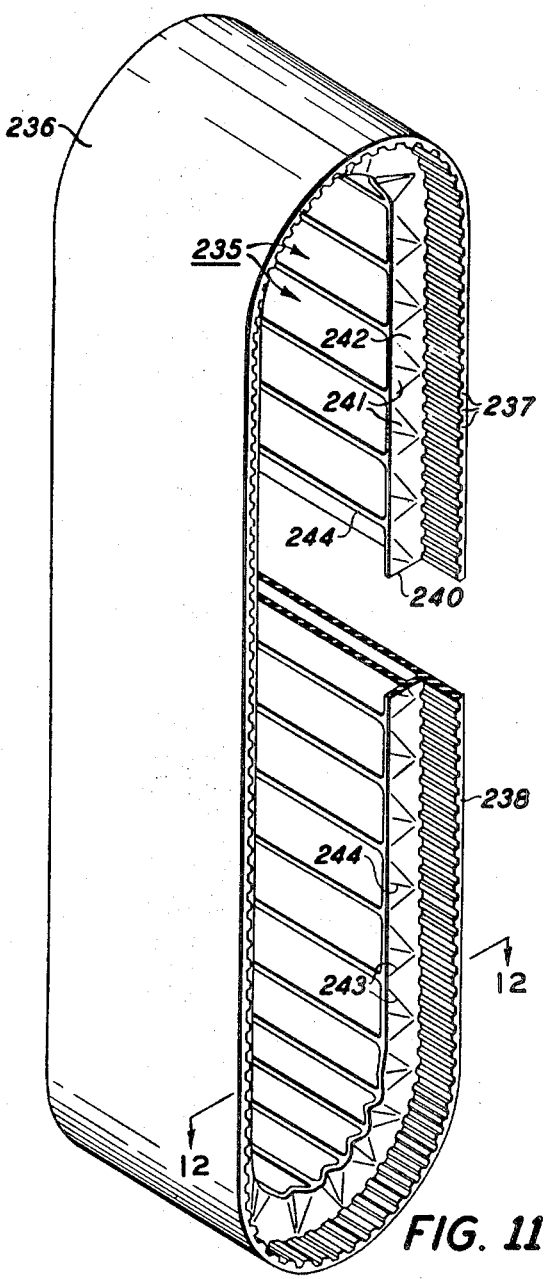
FIG. 11
FIG. 13
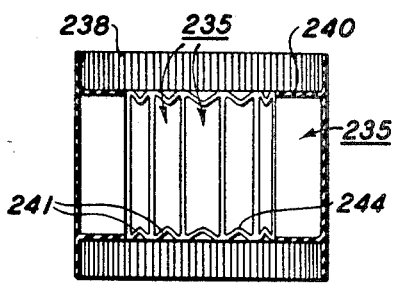
FIG. 12
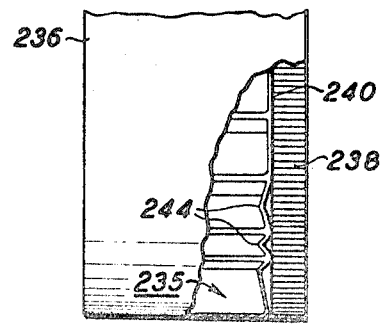
FIG. 14
INVENTOR.
SALVATORE LATONE
BY
ATTORNEYS

CONVEYOR BELT

This invention relates to conveying belts and particularly to improvements in the endless type conveyor wherein particulate material is carried in buckets having openings formed within the interior of the belt. The present invention is particularly adapted for use with automatic copiers/reproducers capable of high-speed operation.

As is well known in recent years, the steadily increasing size of various industries has required an enormous increase in the amount of paper work that must be accomplished, maintained, and made available for wide interplant circulation. In the present day commercial automatic copiers/reproduction machines, which are adapted to produce copies of between 5 and 60 8×11-inch sheets of copy per minute, the photoreceptor device is in the form of a drum which rotates in timed unison relative to a plurality of processing stations and the usual developer system is limited as to the amount of developing material that can be conveyed to a development zone for the machine.

As a solution for overcoming the disadvantages for high speed copying, the latest machine concept for copiers utilizes flash exposure of a document and the arrangement of a moving photoconductor material in the form of an endless belt. However, there has been no effective way in which to present a continuous high volume amount of developing material on the belt for developing the latent electrostatic image produced thereon during the exposure step. One of the significant deficiencies in this regard has been the lack of high volume conveyor means capable of moving material swiftly, at a uniform rate, and which occupies a relatively small space.

It is therefore the principle object of this invention to improve endless conveyors whereby material to be conveyed is directed to and away from internally opened buckets formed as a unitary structure on an endless belt.

Another object of this invention is to improve endless conveyors by including as part of the conveyor structure means adapted to be applied to an external drive system for imparting orbital movement to the conveyor.

Another object of this invention is to form the buckets on an endless conveyor with means for minimizing compaction during movement of the buckets over a dispensing chute.

Another object of this invention is to improve endless conveyors of the internal bucket type so that there is a minimum of material lost during conveying movement and wherein clouding of the material resulting from fast movement thereof is eliminated.

For a better understanding of the invention as well as other objects and further features thereof, reference is had to the following detailed description of the invention to be read in conjunction with the accompanying drawings, wherein:

FIG. 9 is a cross sectional view of the upper horizontal toner transport device taken along line 9-9 in FIG. 4;

FIG. 10 is a cross-sectional view of the lower horizontal developer material transport taken along line 10-10 in FIG. 4;

FIG. 11 is a perspective view of the internal bucket conveyor belt for the toner materials;

FIG. 12 is a cross section taken along line 12-12 in FIG. 11;

FIG. 13 is an end view of the conveyor belt of FIG. 11;

FIG. 14 is a front view partly in section of the conveyor belt;

Figure 1:
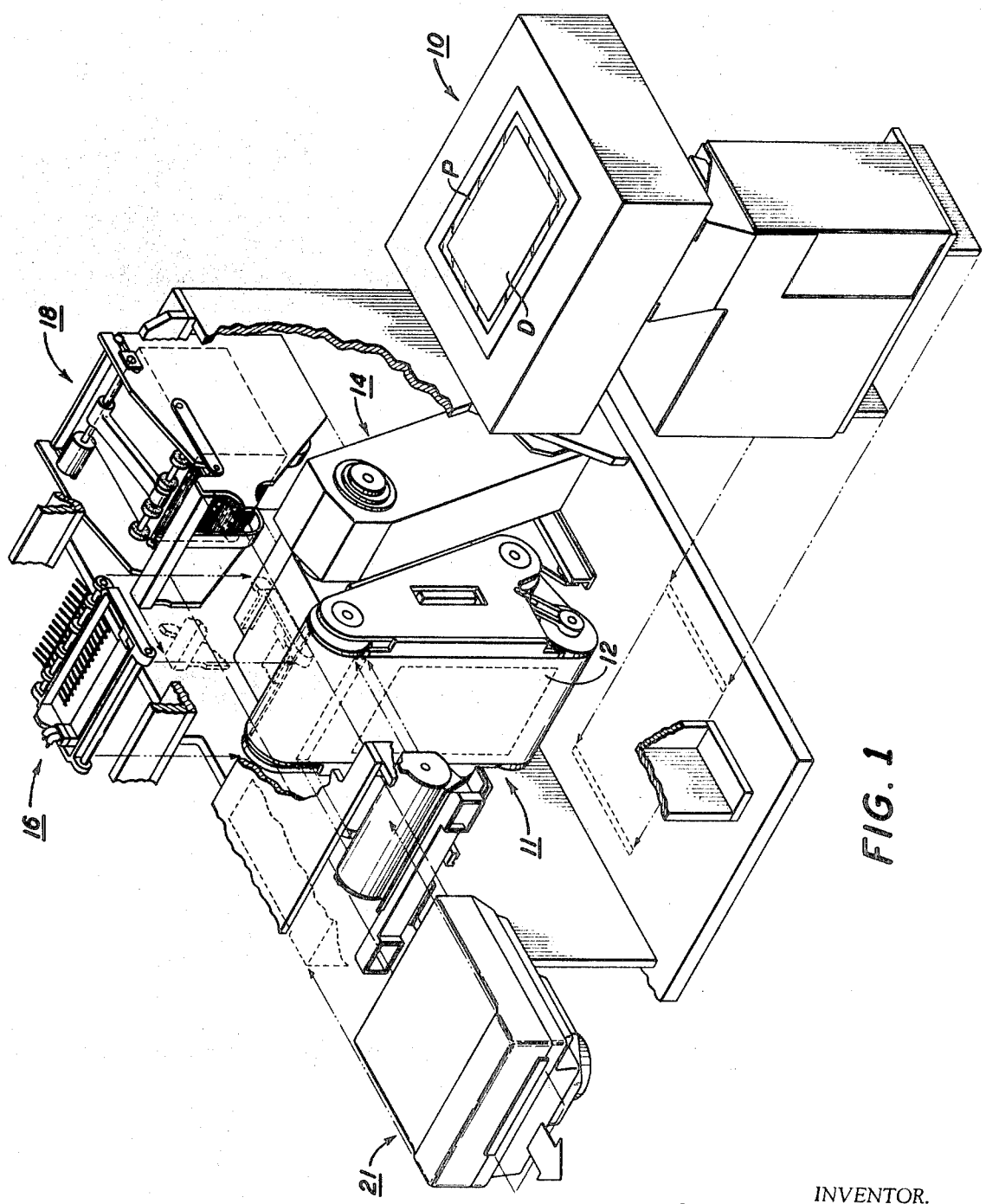
FIG. 1 is an exploded right-hand perspective view of a reproduction machine incorporating the present invention therein with the processing components separated to better illustrate the environment for the present invention.
Figure 2:
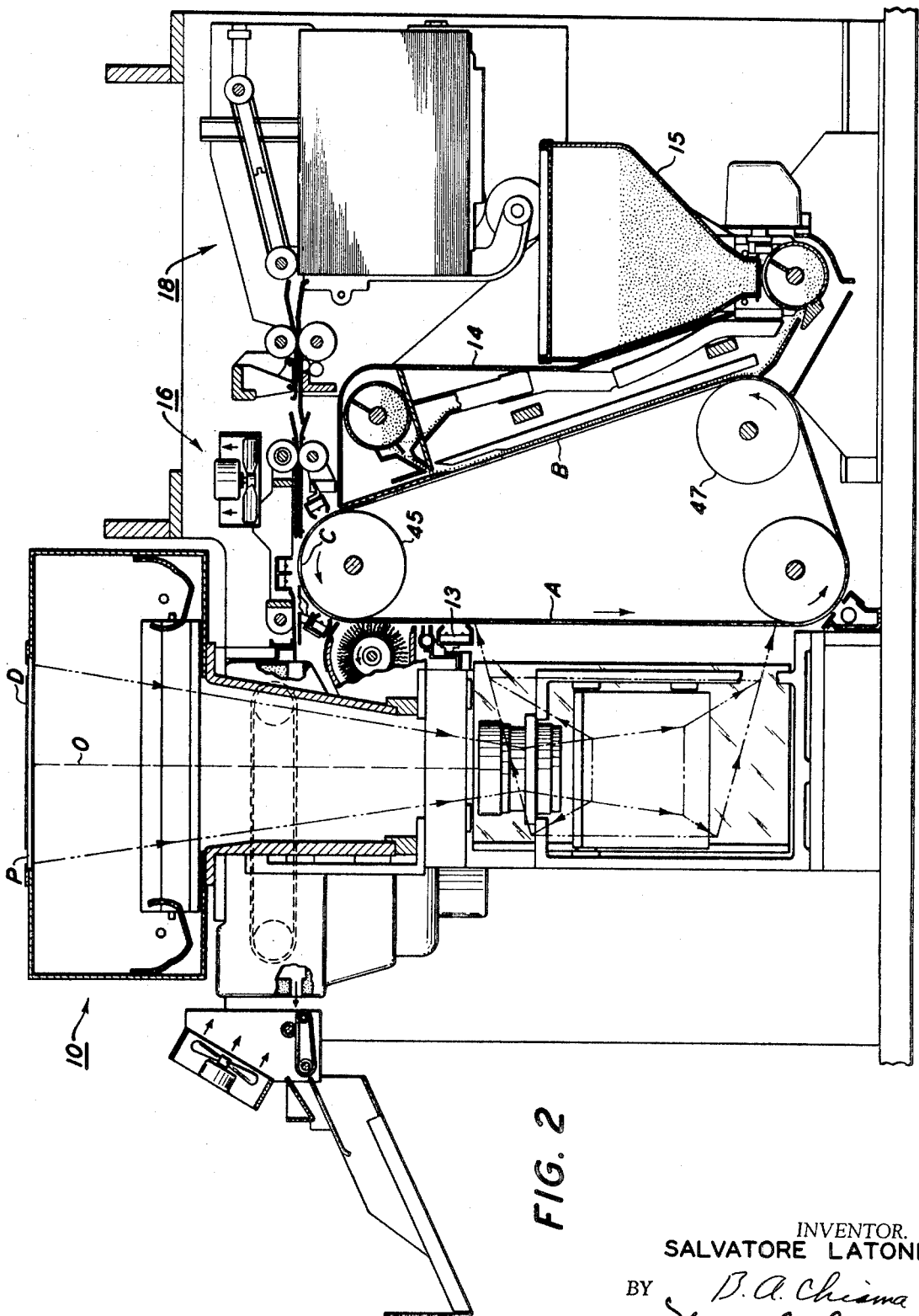
FIG. 2 is a schematic sectional view of the reproduction machine showing the various processing stations.

For a general understanding of the illustrated copier/reproduction machine, in which the invention may be incorporated, reference is had to FIGS. 1 and 2 in which the various system components for the machine are schematically illustrated. As in all electrostatic systems such as a Xerographic machine of the type illustrated, a light image of a document to be reproduced is projected onto the sensitized surface of a Xerographic plate to form an electrostatic latent image thereon. Thereafter, the latent image is developed with an oppositely charged developing material to form a Xerographic powder image, corresponding to the latent image of the plate surface. The powder image is then electrostatically transferred to a support surface to which it may be fused by a fusing device whereby the powder image is caused permanently to adhere to the support surface.

In the illustrated machine, an original to be copied is placed upon a transparent support platen P fixedly arranged in an illumination assembly generally indicated by the reference numeral 10, arranged at the left end of the machine. While upon the platen, an illumination system flashes light rays upon the original thereby producing image rays corresponding to the informational areas on the original. The image rays are projected by means of an optical system for exposing the photosensitive surface of a Xerographic plate in the form of a flexible photoconductive belt arranged on a belt assembly generally indicated by the reference numeral 11.

The photoconductive belt assembly 11 is slidably mounted upon a support bracket secured to the frame of the machine and is adapted to drive a selenium belt 12 in the direction of the arrow as shown in FIG. 2 at a constant rate. During this movement of the belt, the reflected light image of an original on the platen is flashed upon the Xerographic surface of the belt. The belt surface that intercepts the light rays comprises a layer of photoconductive material such as selenium on a conductive backing that is sensitized prior to exposure by means of a charging corona generator device indicated at 13.

The flash exposure of the belt surface to the light image discharges the photoconductive layer in the areas struck by light, whereby there remains on the belt a latent electrostatic image in image configuration corresponding to the light image projected from the original on the supporting platen. As the belt surface continues its movement, the electrostatic image passes through a developing station B in which there is positioned a developer assembly generally indicated by the reference numeral 14 and where the belt is maintained in a flat condition. The developer assembly 14 comprises horizontally and vertically conveying mechanisms which carry developing material to the upper part of the belt assembly 11 whereat the material is dispensed and directed to cascade down over the upwardly moving inclined selenium belt 12 in order to provide development of the electrostatic image.

As the developing material is cascaded over the Xerographic plate, toner particles in the development material are deposited on the belt surface to form powder images. As toner powder images are formed, additional toner particles are supplied to the developing material in proportion to the amount of toner deposited on the belt during Xerographic processing. For this purpose, a toner dispenser generally indicated by reference numeral 15 is used to accurately meter toner to the developer material in the developer assembly 14.

The developed electrostatic image is transported by the belt to a transfer station C whereat a sheet of copy paper is moved at a speed approximately in synchronism with the moving belt in order to accomplish transfer of the developed image. There is provided at this station a sheet transport mechanism generally indicated at 16 adapted to transport sheets of paper from a paper-handling mechanism generally indicated by the reference numeral 18 to the developed image on the belt at the station C.

After the sheet is stripped from the belt 12, it is conveyed into a fuser assembly generally indicated by the reference numeral 21 wherein the developed and transferred Xerographic powder image on the sheet material is permanently affixed thereto. After fusing, the finished copy is discharged from the apparatus at a suitable point for collection externally of the apparatus.

Suitable drive means may be arranged to drive the selenium belt 12 in conjunction with timed flash exposure of an original to be copied, to effect conveying and cascade of toner material, to separate, and feed sheets of paper and to transport the same across the transfer station C and to convey the sheet of paper through the fuser assembly in timed sequence to produce copies of the original.

It is believed that the foregoing description is sufficient for the purposes of this application to show the general operation of an electrostatic copier using an illumination system constructed in accordance with the invention. For further details concerning the specific construction of the electrostatic copier, reference is made to copending application Ser. No. 731,934 filed concurrently herewith in the name of Hewes et al.

In order to effect development of the electrostatic latent image on the selenium belt 12, the development system for the Xerographic reproduction machine, shown in FIG. 2, includes a developer assembly 14 (see FIGS. 3—16) which coacts with the selenium belt 12 at the development zone B. At this development zone, the charged exposed surface of the belt 12 is developed to form a powdered toner image of the original that was previously illuminated.

For this purpose, the developer assembly 14 is mounted adjacent to the belt assembly 11 to establish the development zone B. Mounted within the developer assembly 14 is a screw conveyor arrangement utilized in conjunction with an internal bucket conveyor belt for continuously circulating developer material previously supplied to the upper end of the developer assembly and from where the developer material is cascaded over the now inclined upperly moving selenium belt 12 in order to accomplish development of the latent image thereon. As the developer material cascades over that flat run of the belt 12, between the rollers 45, 47 upon which the belt 12 is mounted for movement, toner particles of the developing material adhere electrostatically to the previously formed electrostatic latent image areas on the belt, the remaining developer material falling off the lower portion of the belt assembly adjacent the roller 47 or the peripheral surface thereof to be deflected by suitable baffle plates into the bottom sump of the developer assembly 14. Toner particles consumed during the developing operation to form the visible powder toned image is replenished by the toner dispenser 15 mounted external to the developer assembly.

Figure 3:
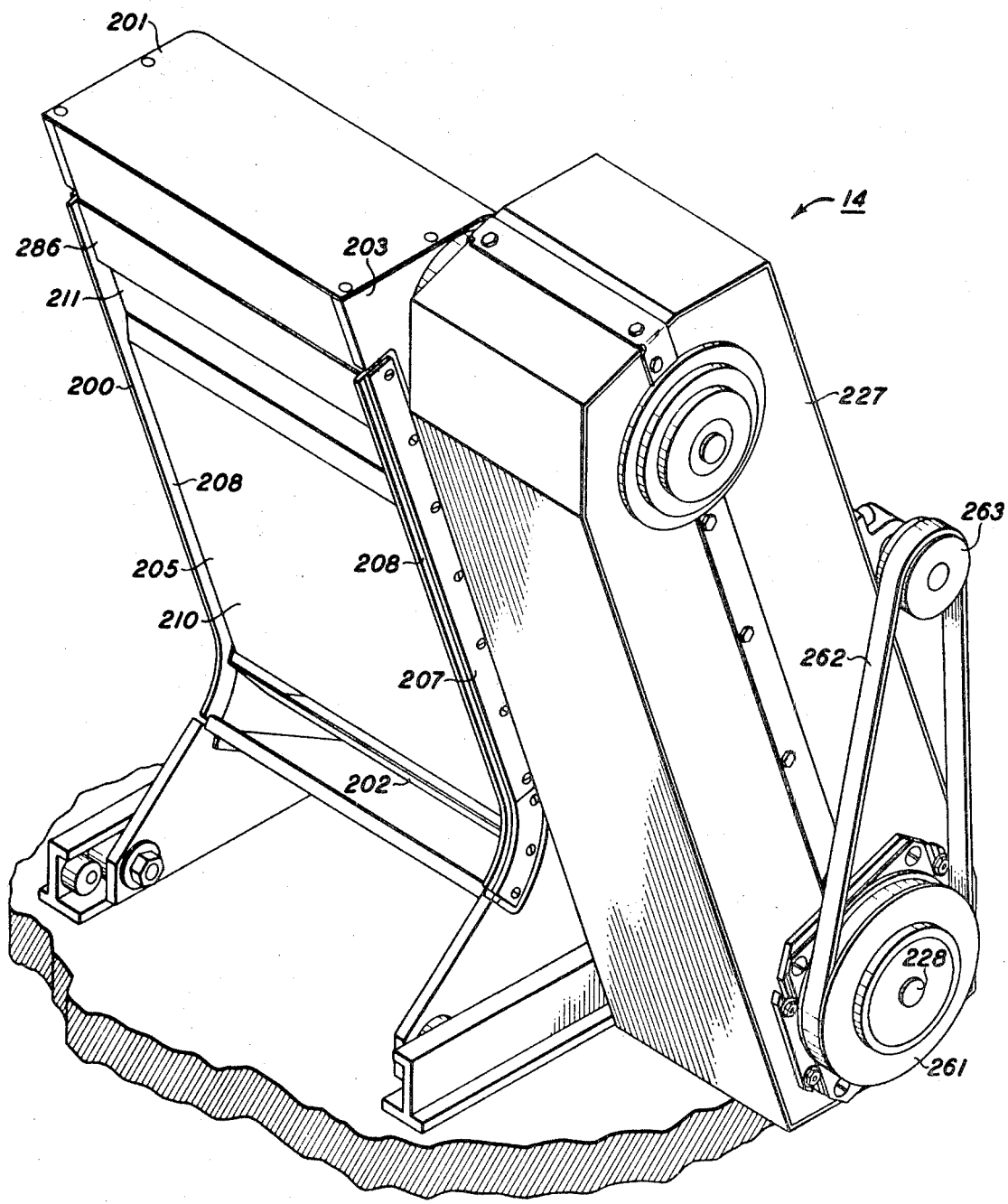
FIG. 3 is a perspective view of the developer apparatus as seen from the front of the machine away from association from the selenium belt utilized in the machine and to which the present invention is applied.
Figure 4:
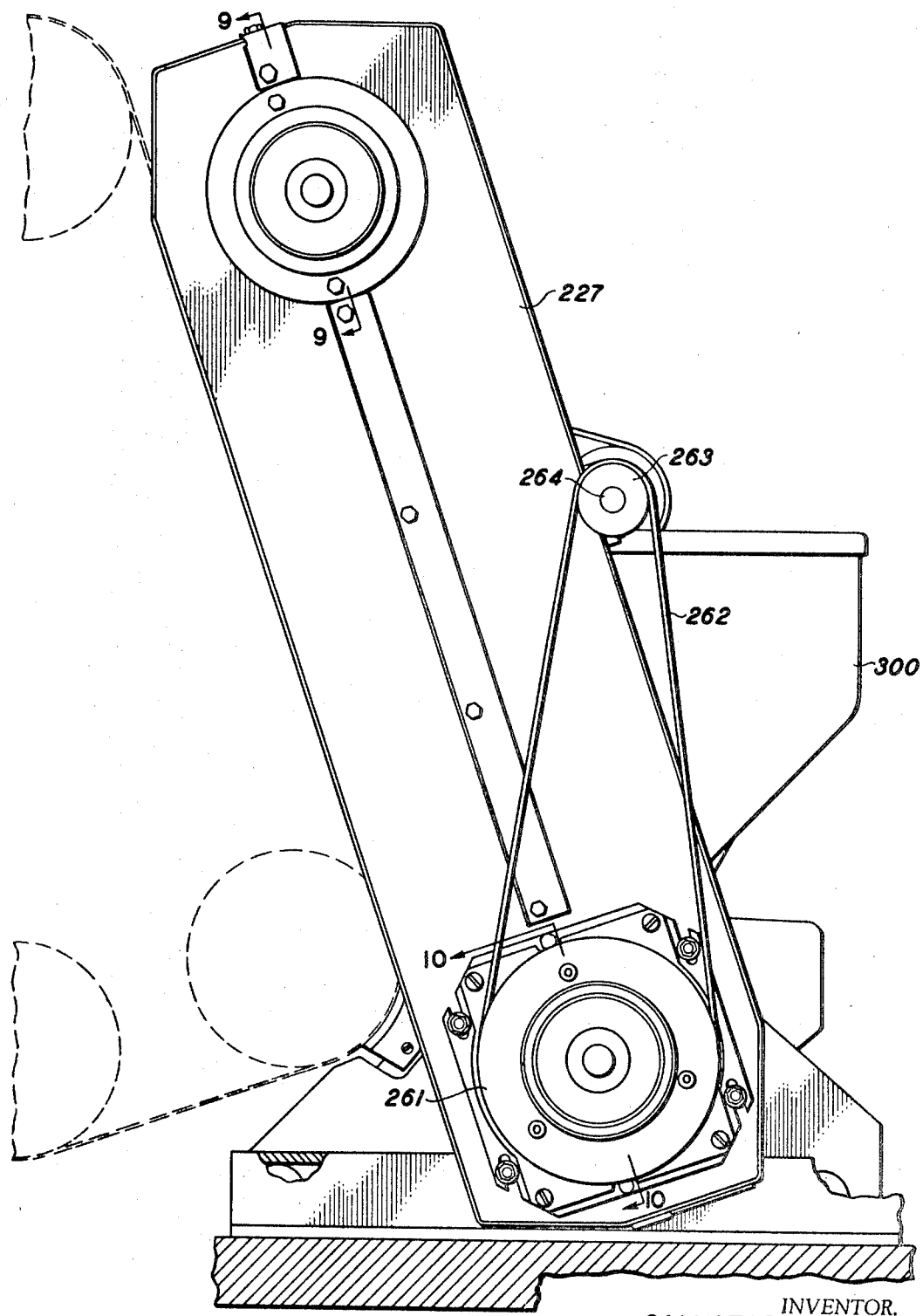
FIG. 4 is a front view of the developer mechanism as applied to a selenium belt.
Figure 5:
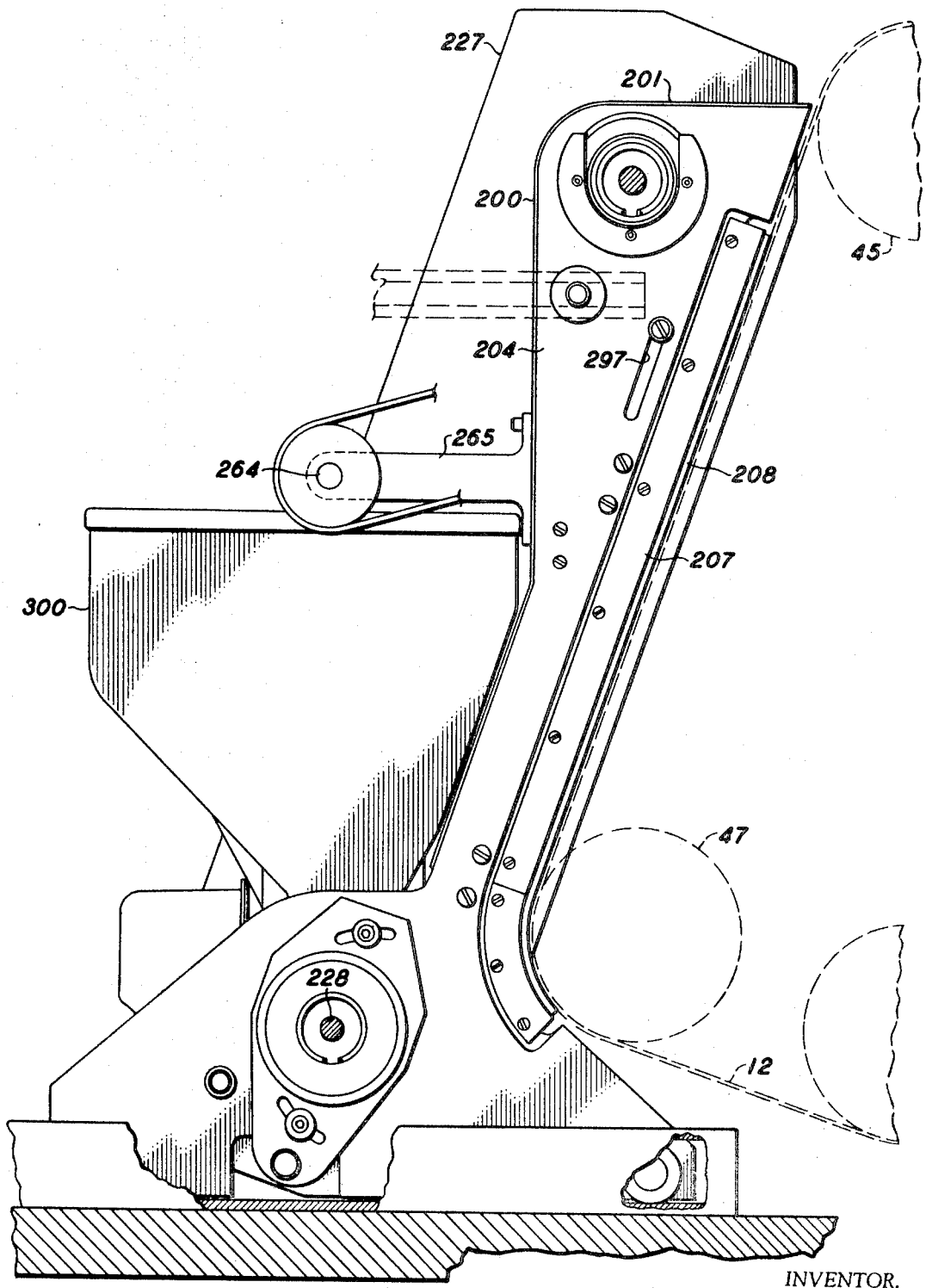
FIG. 5 illustrates the other side of the developer housing of that side which faces the rear of the machine.
Figure 8:
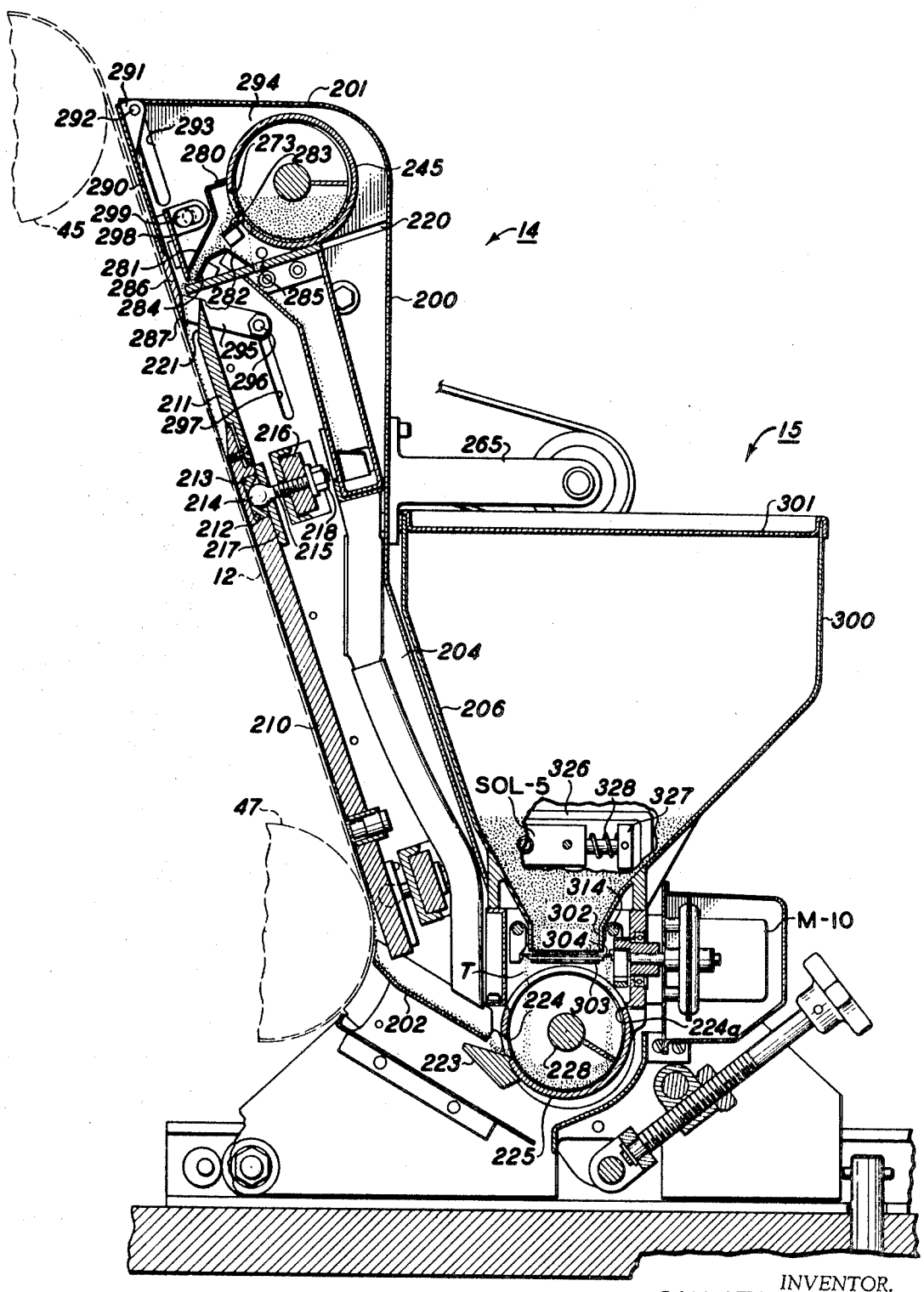
FIG. 8 is a cross section view of the developer housing taken along line 8-8 in FIG. 6.

Specifically, the developing assembly 14 includes an elongated, vertically inclined, boxlike developer housing 200 having a top wall 201, a bottom wall 202 in the form of a toner pickoff baffle, side walls 203 and 204, a front wall 205, and a rear wall 206. As shown in FIGS. 3 and 8, the sidewalls 203 and 204 are shaped with a vertically inclined straight edge portion and a lower curved portion in conformity with the shape the selenium belt 12 assumes during the development function of the machine, as defined by the adjacent portions of the belt roller 47 to permit the developer housing to be positioned closely adjacent to the belt. Secured to the inside faces of the sidewalls 203 and 204 are side baffle plates 207 which support upon and hold against the respective sideplates a packing material in the form of strips 208 which extend slightly toward and against the selenium belt when the developer housing 200 is in operating position in order to prevent excessive dust and air currents from circulating within the developer zone adjacent the belt during a developing function.

In order to be disposed for high quality reproduction, the developing assembly is capable of accomplishing line copy development and solid area development. This is made available by use of a development electrode 210 mounted upon the housing 200 as the front wall 205. The development electrode 210 is positioned so as to assume a spaced relationship relative to the adjacent run of the selenium belt or that run when the belt is held against the rear vacuum plate 70. The development electrode is shaped as a thin wall rectangular plate and includes a thinner walled narrow extension plate 211 which serves as an entrance chute for developer material and which is mounted on but electrical insulated from the top edge of the main electrode plate 210.

Means are provided for mounting the development electrode such that the electrode may be individually adjusted at each of the corners thereof in order to insure exact spacing of the electrode relative to the selenium belt at all points thereon. Since all four of these devices are exactly the same, only one of them will be described in detail. In FIG. 8, the electrode 210 is shown as being formed with a recess 212 for rigid supporting a bearing block 213 into which is positioned a spherical knob 214 having a screw shank 215 secured thereto and being threadedly received in a supporting block 216. The support blocks 216 used in supporting the electrode 210 may be suitably secured to the sideplates 203, 204 of the developer housing and are suitably insulated relative thereto. A lock plate 217 is secured to the inner surface of the electrode 210 in a position to overlie the recess 214 and, is formed with an opening through which the threaded shank 215 projects.

This arrangement secures the knob 214 and shank 215 to the development electrode but allows a limited rotary or universe pivoting movement of the shank 215. The shank portion 215 is adapted to receive a nut 218 which bears against the surface of the support block 216 thereby serving as a means for axially moving the shank 215 for positioning this particular corner of the development electrode 210 relative to the fixed support block 216. The electrode adjustment device is provided on each four corners of the development electrode 210 thereby providing individual adjustment means for the electrode.

During the developing function, development material comprising very small diameter carrier beads having smaller toner particles electrostatically adhering thereto, is introduced in the space between the development electrode 210 and the adjacent run of the selenium belt 12. As will be described more fully hereinafter the development material is introduced along a thin slot formed between the belt 12 and the adjacent longitudinal edge of a plate 220 secured in the upper region of the developer housing 200. The development material then is cascaded downwardly and enters the space between the tapered portion 221 at the upper edge of the electrode entrance chute 211 which, as observed in FIG. 8, is spaced at a slightly greater distance from the belt 12 than is the lower main portion of the electrode. The development material then falls freely between the electrode portions and the selenium belt during which time and distance the toner particles are pulled away from the carrier beads by action of the electrostatic charged image on the belt 12.

Preferably, the development electrode 210 is spaced as close as possible taking in consideration that the spacing between electrode and the selenium belt 12 influences the electrostatic field strength and must be such that the cascading development material has sufficient spacing to be free to fall in cascading motion therebetween.

Denuded carrier particles and other toner particles which were not employed in developing the latent image and which have passed into the lower spacing between the plate 210 and the belt 12 are deflected upon the pickoff baffle 202 which is electrically biased and carries the particles back into a conveyor system for the development material.

These particles are conveyed to a chute 223 extending across the entire width of the housing 200 and being suitably mounted on the side plates 203, 204 thereof. The toner particles and denuded carrier particles are directed by the chute 223 into a developer material return system comprising a first conveyor screw arrangement for conveying development material that has been cascaded over the surface of the belt 12, an internal bucket vertical conveying belt for conveying this material vertically to a position above the entrance chute 211 for the development electrode 210 and, a second conveyor screw for conveying the development material horizontally from the internal bucket conveyor belt to position developer in a sump which is in communication with the upper reaches of the spacing between the development electrode and the belt 12 preparatory to continuous recascading of the material across the selenium belt 12. The chute 223 directs a developer material through an elongated slot 224 formed in a lower conveyor tube 225 secured to the sideplates 203, 204 and extending out of the housing 200. The tube 225 houses a screw conveyor 226 which is continuously rotated during operation of the developer assembly and which functions to convey developer material horizontally out of the developer housing 200 and into a vertical return system.

Developer material is conveyed out of the developer housing 200 and into a developer return housing 227 mounted in spaced relation and parallel to the side plate 203 for the housing 200. The developer return housing has an elongated configuration, the axis of which is in alignment approximately with the planar format of the developer housing, that is, slightly inclined relative to the vertical. The screw conveyor 226 is mounted on a shaft 228 that has one end mounted for rotation in bearing 230 secured to an end wall 204 of the developer housing and the other end rotatably mounted in a bearing 231 secured in a hub 232 which, in turn, is secured to the inner surface of the conveyor tube 225 at that end thereof positioned within the return housing 227. As will be described hereinafter, a drive mechanism for the screw conveyor 226 is provided for this function and other driving functions relative to the developer return system.

Developer material being conveyed by the screw 226 is carried within the housing 227 and to an opening 234 formed in the lower portion of the tube 225 within the housing 227. The opening 234 permits the egress of the developer material from the tube and directs the material into any one of a plurality of internal buckets 235 formed as part of an internal bucket conveyor belt 236 which encircles the tube 225 at this point.

The conveyor belt 236 is constructed so that its internally directed buckets 235 are slightly longer in length than the egress opening 234 to insure a minimum of loss of developer material. The construction of the belt 236 is shown in greater detail in FIGS. 11—14, and, as illustrated, it will be appreciated that the belt is constructed as a unitary element that may be fabricated as an integral unit by a suitable molding process. The belt 236 is relatively wide and is constructed as an endless conveyor utilizing a plurality of internal buckets 235 each of which has a length approximately two-thirds the width of the belt. Formed internally along each of the outer edges of the belt for the entire circumference thereof are evenly spaced teeth 237 which are arranged for use as timing belts 238 for driving the conveyor belt 236 during conveying of the developer material.

Figure 7:
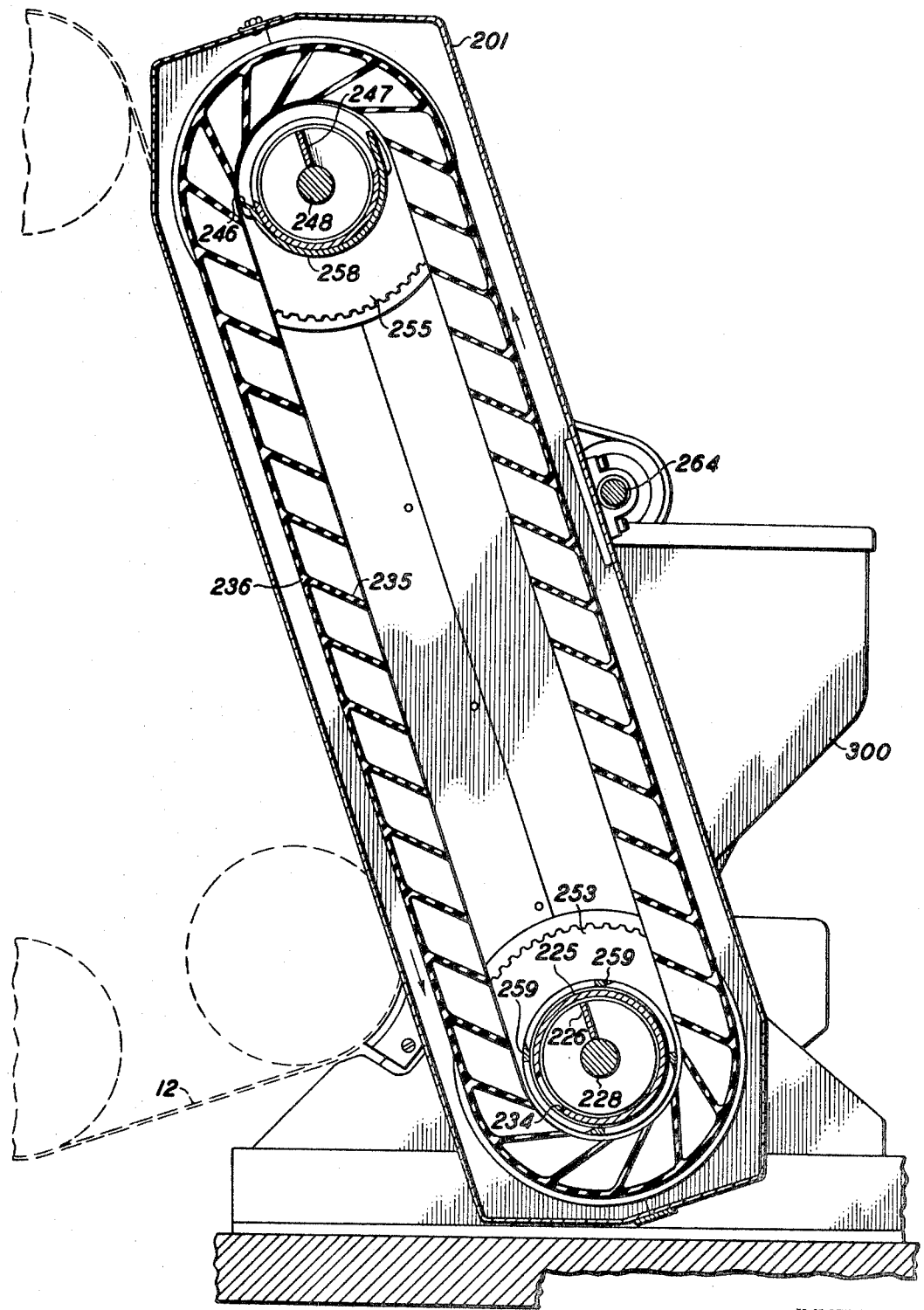
FIG. 7 is a cross-sectional view taken along line 7-7 in FIG. 6 and showing the vertical transport belt.

Each of the internal buckets is defined by a circular wall 240, one on each side of the belt between the buckets and the adjacent timing belt. During construction of the belt 236, it is preferable that the timing belts 238, the circular walls 240, and the buckets 235 are fabricated as a unitary structure. The portion of the circular walls 240 located at the end of each bucket is formed with a fanfold construction comprising small triangular shaped panel walls 241, 242 for each end of a bucket 235. The panel sections are adapted to be flexed relative to each other along flexure lines 243 formed in the circular wall and each of the panels 241 is adapted to flex inwardly along a line 244 formed at each end of a bucket. This flexure occurs for both of the circular walls 240 when the conveyor belt 236 is driven around the tube 225 for the screw conveyor 226. As shown in FIG. 7, as the buckets 235 are driven around the tube, the entrance slots for the buckets become more narrow since they are assuming a smaller circumference than the outer portions of the buckets adjacent the outermost portions of the belt. In order to prevent compaction of the material contained in each of the buckets as the entrance slots therefor become smaller, the amount of developer material allowed to enter a bucket is held to approximately two-thirds of its total volume. During movement of the belt around the tube 225, the panels 241 and 242 will deflect slightly inwardly without causing compaction of the material therein in order to prevent the lateral lengthening of the buckets with the consequent binding of the material comprising the walls 240 against supporting pulleys therefor.

As the developing material is directed into the buckets 235, the belt 236 continuously moves in the direction shown by the arrow in FIG. 7 to bring the development material to a higher point above that in which cascade upon the selenium belt 12 will occur. Upon reaching its uppermost point, each of the buckets are drawn around a conveyor tube 245 extending through the return housing 227 through a slot 246 formed in the upper portion of the tube. As the buckets 235 are moved upwardly and around the tube 245 and when the opening slots of the buckets are in register with the opening 246, the development material is adapted to be poured from each of the buckets and into the interior of the tube 246.

The tube 245 is similar to the tube 225 and serves to contain a conveyor screw 247 which serves to convey developing material horizontally from the developer return housing 227 and into the developer housing 200 preparatory to movement of the developer material into cascading position. The screw 247 is mounted for rotation upon a shaft 248 supported in a bearing 249 mounted in the end plate 204 and a bearing 251 secured in a hub 252 mounted on the internal surface of the end of the tube 245. The shafts 228 and 248 for the screw conveyors 226 and 247, respectively, are parallel to each other and preferably, have their axes in a plane parallel to the plane of the selenium belt 12. During operation of the developer assembly, the lower conveyor screw 226 and the upper conveyor screw 247 are driven in unison in opposite directions and, are adapted to convey each in its own direction as indicated by the arrow, approximately the same quantity of development material in order to prevent the advancement of movement of development material of one of the screw conveyors over the other.

In order to effect vertical continuous movement of the developer material from the sump of the developing housing and into a higher position by means of the conveyor belt 236, there is provided a pair of pulleys 253, 254 arranged around conveyor screw 226 for the lower end of belt 236 and, a second pair of pulleys 255, 256 arranged around the conveyor screw 247 for the upper end of the conveyor belt. The lower pulleys 253, 254 are arranged coaxially in spaced relation by a cylindrical cage element 257. The spacing of the lower pulleys 253, 254 are slightly greater than the length of the buckets 235 and, are formed as timing pulleys engageable with the timing belts 238 formed on each edge of the conveyor belt 236. Similarly, the timing pulleys 255 and 256 are held apart in spaced relation upon a cage element 258 and engage the timing belt 238. Each of the cage elements 257 and 258 are formed as rods 259 (see FIG. 7) radially extending from the axis of a shaft 228 and evenly spaced therefrom to provide fairly large openings therebetween. The rods 259 are preferably made integral with the spaced pulleys which they separate in parallel relationship. Similarly, the upper cage element 258 is formed as a semicylindrical thin-walled element which may be made integral with the adjacent sides of the pulleys 255, 256.

In order to impart movement to the belt 236 for producing conveying action, the lower outside pulley 254 is formed with an annular hub 260 which extends through a suitable opening in the side plate of the housing 227. A driven pulley 261 is fastened by screws to the hub 260 and is connected by a timing belt 262 to a smaller pulley 263 secured to a shaft 264 mounted by brackets 265 on the developer housing 200. The shaft 264, in turn, is connected to a suitable drive system described in the above referred to copending patent application.

The driven pulley 261 and the lower pulleys 253, 254 are supported for rotation upon the tube 225 by a pair of bearings 266 one of which is positioned between the pulley 253 and the tube and, the other, positioned between the driven pulley 261 and the outer end of the tube 225. In order to prevent the leakage of developer material out of the housing 227, the opening through which the hub 260 projects outwardly is surrounded by a sealing device 267 held onto the outside wall of the housing 227 by a cover plate 268. At the other side of the housing 227 an O-ring 269 is suitably locked in position encircling the tube 225 and against metallic lock rings which hold the tube 225 in position relative to that side of the housing 227.

The upper conveyor belt pulleys 255 and 256 are mounted for rotation upon the tube 245 by a pair of bearings 270 mounted between the external surfaces of the tube 245 and the pulleys. This arrangements permits unobstructed free rotation of the pulleys 255 and 256 relative to the tube 245 and the conveyor screw 247. A threaded thimble 271 serves to lock to the outer bearing to the tube 245 and to compress a suitable sealing device 272 between the tube 245 and to compress a suitable sealing device 272 between the tube 245 and the side of the housing 227 in order to prevent leakage of developer material through the opening in the sidewall occasioned by the protrusion of the tube.

It will be apparent that rotation of the driven pulley 261 will produce rotation of the lower conveyor pulleys 253, 254 to cause movement of the conveyor belt 236. In operation of the development return system, both of the pulley arrangements 253, 254 and 255, 256 are driven in unison in order to convey development material out of the tube 225 after the material has been cascaded across the selenium belt 12 and to convey the material vertically to a higher point to the interior of the upper tube 245. The material is poured from each of the buckets 235 in the belt 236 and through the opening 246 into the interior of the tube 245 whereupon the development material is conveyed horizontally to be spread across the entire length of a longitudinal slot 273 formed in a lower region of the tube 245 that extends into the developer housing 200.

Rotation of the conveyor screws 226 and 246 is imparted by means of a lower sprocket 274 connected to the outer end of the lower shaft 220 and an upper sprocket 275 of equal diameter, connected the outer end of the screw shaft 248. A chain 276 is arranged around the sprockets 274, 275 for causing the same rotative movement of the screws. A drive pulley 277 is also secured to the lower conveyor shaft 288 and is connected by a timing belt 278 to a drive system (not shown) but described in the above referred to patent application.

From the foregoing description of the developer material return system, it will be appreciated that the system is adapted to retrieve previously cascaded development material and to convey the same horizontally, that is, perpendicular in direction to the free fall cascading motion of the development material, thence to convey the material vertically in a line perpendicular to the previous stage of horizontal and conveyance, to bring the development material to a higher level preparatory to the cascading action. After the development material is brought to a higher plane it is once again conveyed horizontally and positioned to assume a continuous relatively long, flat sheet or shower of fallen developer material which disposed for cascading action over the selenium belt 12.

As the development material is poured out of the slot 273 (see FIG. 8) the material is directed into an elongated hopper 280 mounted upon the upper plate 220 in the upper region of the developer housing 200. The hopper 280 extends across the entire width of the housing 200 and is defined by an inclined top wall 281, a curved bottom wall 282 and a deflection plate 283 for directing the flow of most of the developer material from slot 273 and into the long narrow passageway 284 defined by the walls 281, 282. Some of the developer material as it leaves the deflection plate 283, is carried upon the other side of the curved plate 282 remote from the passageway 284 in order to permit some of the development material to fall by gravity through an opening 285 formed in the support plate 220 for purposes to be described hereinafter.

The development material leaving the passageway 284 continues its downward movement and flows between one edge of the plate 220 and a control plate 286 which is relatively narrow and extends across the entire width of the housing 200. The plate 286 is in the same plane as the out surface of the development electrode 205 and is formed with a lower tapered edge 287 that cooperates with the tapered edge portion 221 of the electrode entrance chute 211. Developer material in passing between the edge of the plate 220 and the opposite side of the plate 286 slides down the tapered portion 287 and into the region between it and the tapered edge 221 and then between the chute 211 and the selenium belt in position to begin the cascade development function. The developer material falls in the form of a thin, wide sheet of falling particulate material to be influenced by the electrical charge on the belt 12 and the field charge between the belt and the electrode 210. The plate 286 may be raised or lowered in order to vary the spacing between the tapered edge 287 and the cooperating adjacent tapered edge 221 to control the amount of developer material that is permitted to fall between itself and the chute.

Positioning of the control plate 286 is provided by a movable plate 290 positioned across the width of the development housing 200 and approximately in the same plane as the control plate 286 which is connected along one edge thereof. The upper edge and ends of the plate 290 are provided with tongues 291 carrying pins 292 insertable in slots 293 formed in plates 294 secured to and positioned inwardly of the plates 202, 203. At the lower tapered edge 287 of the control gate 286, there is formed at each end thereof a strap 295 having its free end formed with a suitable opening through which screw 296 extends and is fastened and received in a slot 297 for permitting the smooth control movement of the gate 286 along its plane. The screw 296 is arranged to position the tapered edge 287 closer or further away from the adjacent tapered edge of the chute 211 in order to control the amount of development material flowing therebetween. The cam screw 296 also carries a locking nut in order to lock the gate 286 in a desirable adjusted position.

The flow of developer material through passageway 284 is under control of a gate member 298 mounted for movement toward and away from the plate 220 for controlling the amount of developer material that may reach the space between the opposing tapered edges 221 and 287. Planar movement of the gate 298 is accomplished by means of a cam screw 299 made cooperable with the edges of a slot and which not only supports the gate 298 but also serves to place the lower edge thereof in abutment against the top surface of the plate 220 or to provide sufficient spacing therebetween in order to permit full egress of developer material from the hopper 280.

As the developing mixture is cascaded over the Xerographic belt 12, toner particles are pulled away from the carrier beads and deposited on the belt to form powder images, while the partially denuded carrier beads and excess toner pass off the belt and into the developer housing 200 by way of the pickoff baffle 202 as previously described. As toner powder images are formed especially for solid area development additional toner particles must be supplied to the developing mixture in proportion to the amount of toner deposited on the selenium belt. To supply additional toner particles to the developing mixture, the toner dispensing system 15 is utilized to accurately meter toner to the developing mixture within the lower portion of the developer housing 200.

Referring to FIGS. 7, 9, 15 and 16, toner dispenser 15 comprises a hopper or toner container 300 into which is contained a relatively large supply of toner particles that may be poured into the container from an external source through a suitable cover 301.

The container 300 is formed as a truncated bin having a lower discharge nozzle section 302 through which toner is fed into the lower conveyor tube 225. Control of the flow of toner is accordance with the density characteristic of developed images is in the form of a toner plate 303 and a metering gate 304, the latter being mounted for reciprocatory movement across the lower opening of the nozzle 302.

The metering gate 304 is mounted in a carriage 305 which is mounted for reciprocatory movement in order to move the metering gate 304 relative to the toner plate 303 and thereby produce controlled flow of toner from the container 300 into the lower conveyor tube 225.

The container 300 rests upon a frame structure 306 which has a slightly enlarged, generally rectangular shape similar to that of the nozzle section 302. Actually the nozzle section 302 fits into the interior of the frame structure which comprises longitudinally extending side frame elements 307 and 308, and end elements 309. The lower edges of the sides elements 309 are formed with circular edges 310 adapted to rest upon adjacent end edges of the opening 224a formed in lower conveyor tube 225 and may be arranged to prevent the leakage of toner material between the edge 310 and the tube during flowing of the toner particles.

The end elements 309 are also formed with deep recesses which terminate in a flat plane surface 311 having a width slightly larger than the width of the toner plate 303 and which accommodate the ends of this plate. Each end of the plate 303 is provided with adjusting setscrews 312 which are suitably rotated to position the corresponding end of the plate 303 relative to the surface 311. A lock screw 313 is slidably received through a suitable opening in each end of the plate 303 and adapted to be threadedly received in a tapered opening formed in the lower section of each of the end elements 309. The setscrew 313 is formed with a shoulder engageable with the top surface of the plate 303 and when turned down serves to lock the plate upon the surface 311, being spaced therefrom by the setscrews 312. The setscrews 312 serve as adjusting devices for the plate 303 in relation to the relatively fixed metering plate 304 in order to maintain the spacing between these plates at a predetermined distance which may be set in accordance with the toner material and the diameter of the individual particles thereof.

Figure 15:
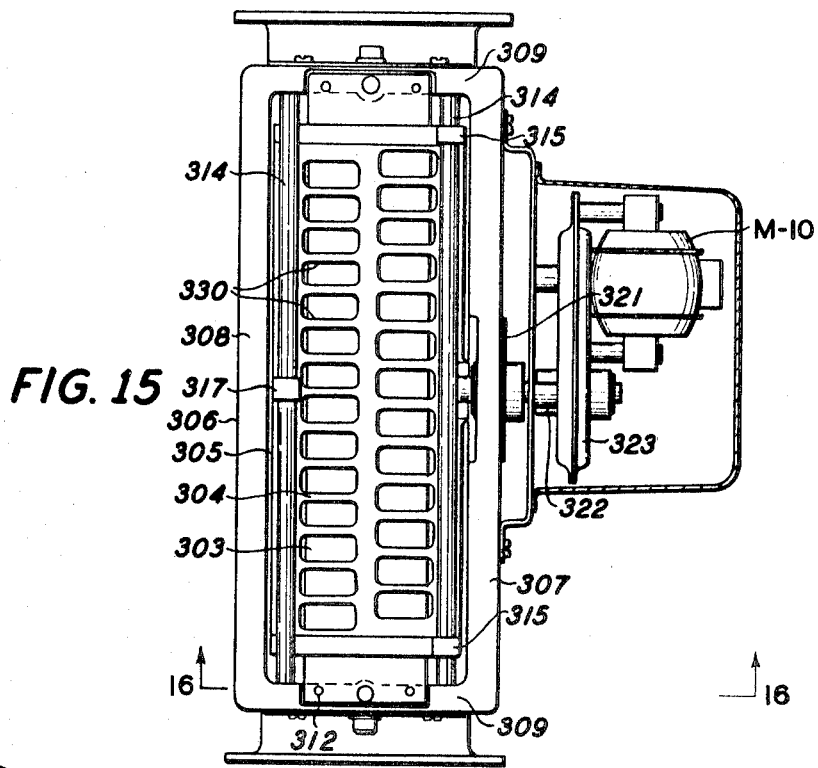
FIG. 15 is a plane view partly in section of the toner dispensing mechanism utilized with the developer assembly of FIG. 3.
Figure 16:
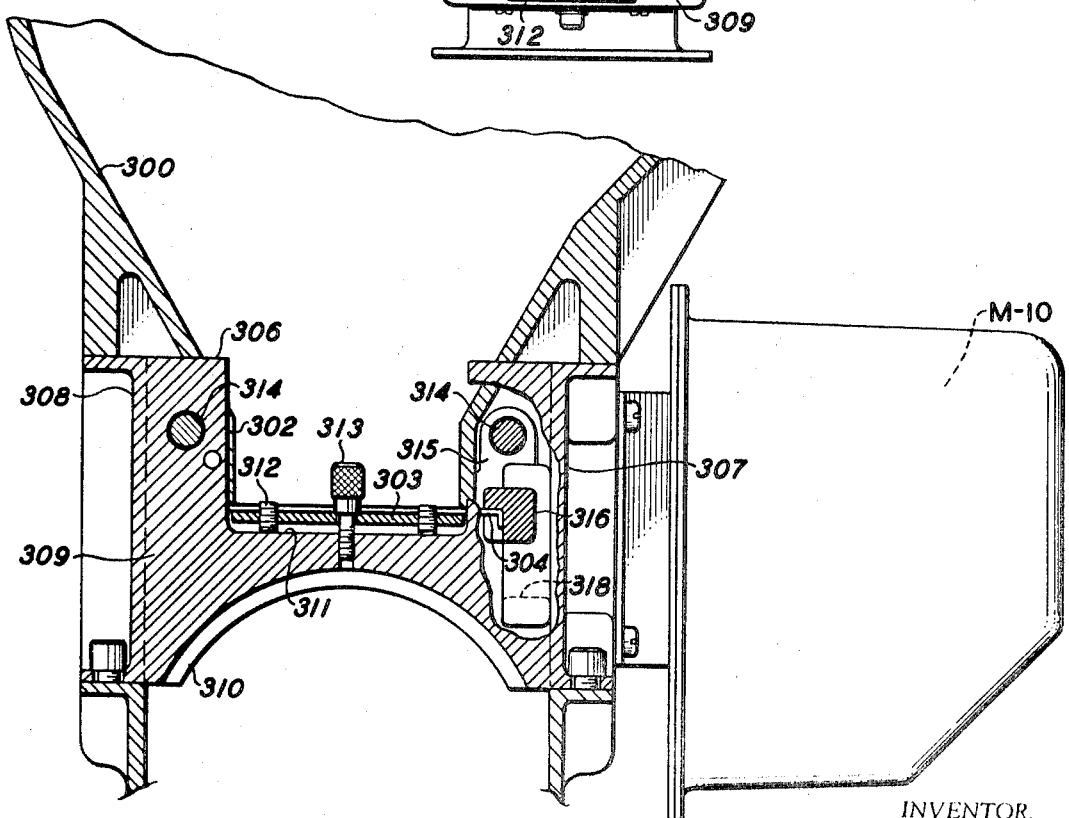
FIG. 16 is an enlarged sectional view partly broken away of the toner dispenser taken along the line 16-16 in FIG. 15.

As previously stated, the carriage 305 is mounted for reciprocatory motion relative to the nozzle section 302 for imparting corresponding motion to the metering gate 304. In order to accomplish this reciprocatory motion the frame structure 306 is provided with a pair of guide rods 314 mounted with their axes in parallel, in spaced relation on either side of the nozzle section 302 and slightly above the position of the gate. The rods 314 are suitable retained within apertures formed on both of the ends elements 309. As shown in FIG. 15, the carriage 305 includes end slides elements 315 which are connected at the ends of a longitudinally extending frame 316 to which the metering gate 304 is attached. The frame 316 is also provided with a rear upstanding slide element 317 through which the rear guide rod 314 extends. The rods 314 support the carriage 305 by means of the two end elements 315 and the rear element 317 in a sliding relationship in order to permit reciprocatory motion by the carriage.

In order to impart motion to the carriage 305, a front frame section of the frame 316 is provided with a vertically extending slot 318 formed in a central portion between the end elements 315. The slot 318 is adapted to slidably receive a drive pin 320 secured off center relative to a rotatable drive element 321 which in turn is secured to the drive shaft 322 extending from a gear reduction box 323 which derives its power from a motor M–10. Upon energization of the motor M–10, the gear box 323 imparts motive force to the drive element 321 for producing circular orbital movement of the drive pin 320. Since the drive pin 320 is confined within the vertical slot 318, as the pin orbits, the carriage 305 will reciprocate in a horizontal plane a total distance equal to the diameter of the orbital movement of the pin 320. Energization of the motor M–10 for this purpose may be under control of a toner sensor control (not shown) but described in detail in the above referred-to patent application.

Figure 6:
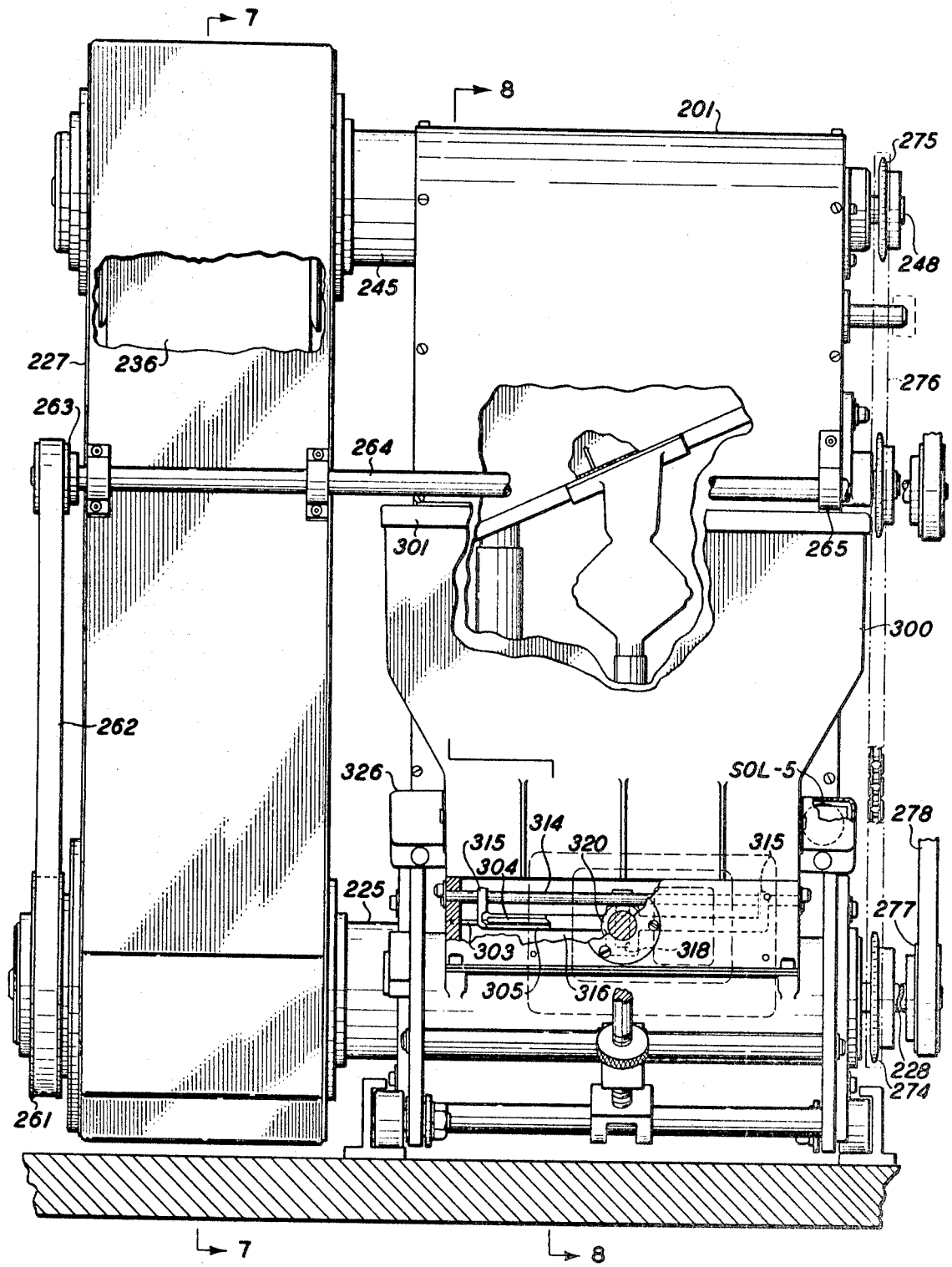
fig. 6 is a rear elevational view partly broken away of the developer housing of that side that is remote from the selenium belt.

The toner container 300 is also provided with a periodically energized solenoid on each said thereof. As shown in FIGS. 6 and 8 a pair of solenoids SOL–5 are mounted on each side of the container 300 and are contained in suitable housings 326. Each solenoid is provided with a weight 327 attached to the armature for the solenoid and a spring 328 held in compression between the weight and the solenoid coil for normally biasing the weight outwardly to the outer extend of movement for the armature. Upon energization of the solenoids, the respective armature is drawn inwardly to force its associated weight toward the solenoid coil against the bias of the spring 328. Upon release of energization of the solenoid the weight will be driven under action of the spring to its extreme outer position. A control circuit may be provided for energizing the solenoids SOL–5 periodically in order to impart quick motion to the weights 327 to produce a slight hammering upon the toner container 300 thereby preventing impaction of the toner particles and constantly maintaining the downward movement of toner for eventually egress through the nozzle section 302.

Normally in the operation of the toner dispenser, with a supply of toner particles placed within the container 300, the metering plate 304 and the toner place 303 form a control gate for holding back the toner particles from entering the conveyor tube 225 through the conforming opening 224a. Upon reciprocation of the gate 304 by the rotation of the drive element 321, a metering quantity of toner particles will be permitted to pass through the double row of large openings 330 formed in the gate 304 and to fall upon the stationary plate 303. With toner particles being built up upon the plate 303, a metered quantity of toner will steadily cascade over the two longitudinal edges of the plate from where the toner will fall into the tube 225. Since the width of the toner plate 303 is greater than the internal width of the nozzle section 302, the latter prevents the toner particles from falling directly through the openings 330 and into the tube 225 without first falling upon the plate 303 to be metered thereby. The toner then actually follows a tortuous path as shown in FIG. 8 by reference numeral T indicating a typical path of toner fall.

Since the toner dispenser 15 dispenses a uniform quantity of toner for a given stroke length of the metering gate 304, it is apparent that the quantity of toner delivered by the toner dispenser may be varied by the number of strokes of such movement per unit of time. Accurate control of the dispensing rate for the toner dispenser can be accomplished by controlling the time in which the motor M–10 is energized and the rate of reciprocation of the gate 304, the latter activity being determined by the gear reduction ratio for the gearbox 323. Assuming that the gearbox is adapted to rotate the drive shaft 322 at approximately 50 r.p.m., it will be seen that the metering gate 304 will experience relatively few reciprocatory cycles for any particular time during which the motor M–10 is energized. It will be apparent with the foregoing arrangement then that more accurate control is available with the use of a relatively slow reciprocatory movement of the metering plate 304 since only the motor energization period which can be relatively broad in view of this slow movement, need be varied to control toner dispensing.

While the invention has been described with reference to the structure of a copier reproduction machine disclosed herein it is not confined to the details set forth and this application is intended to cover other uses and machines and modifications therefor as may come within the scope of the following claims:

I claim:

1. A conveyor adapted for endless orbital movement about an orbital path for transporting particulate material from a lower point to an upper point including an endless flexible support belt being relatively wide, a plurality of buckets arranged transversely and horizontally on the belt, each said bucket comprising a bottom member, and two end walls, one edge of the said bottom member and each end wall fixed to said belt, the belt itself forming the backwall of the bucket, said bottom member inclined upwardly and extending inwardly with respect to the belt, said end walls spaced inwardly from the respective edges of the belt, rotary elements engageable with the interior surfaces of the belt between the ends of the buckets and the adjacent belt edge for supporting the belt in its orbital path of movement, and drive means operable upon at least one of said interior surfaces for imparting movement to the belt thereby producing orbital movement thereof, wherein the flexible belt and the buckets are structurally integrated thereby forming a unitary structural member.